United States Patent [19]
Paulman

[11] Patent Number: 6,146,470
[45] Date of Patent: Nov. 14, 2000

[54] METHODS OF BRAZING AND PREPARING ARTICLES FOR BRAZING, AND COATING COMPOSITION FOR USE IN SUCH METHODS

[75] Inventor: Roger Paulman, Barrington, Ill.

[73] Assignee: Peerless of America Incorporated, Lincolnshire, Ill.

[21] Appl. No.: 09/104,786

[22] Filed: Jun. 25, 1998

Related U.S. Application Data

[62] Division of application No. 08/703,021, Aug. 26, 1996, Pat. No. 5,772,104.

[51] Int. Cl.$^7$ .................................................. B23K 35/34
[52] U.S. Cl. ................................. 148/23; 148/24; 148/25
[58] Field of Search ................................. 148/23, 24, 25

[56] References Cited

U.S. PATENT DOCUMENTS 5,346,558  9/1994  Mathias ........................................ 148/23

*Primary Examiner*—Melvyn Andrews
*Attorney, Agent, or Firm*—Gardner, Carton & Douglas

[57] ABSTRACT

Methods of brazing and coating and preparing articles for brazing and coating are disclosed. Prior to assembly and brazing, the articles are coated with a coating composition including a hot melt adhesive medium and brazing materials. To coat the articles, the hot melt adhesive medium and brazing materials are first mixed at elevated temperatures to form a liquid coating material, the material is allowed to harden, and the hardened material is then melted onto the articles to form a hard coating. The coated articles are then assembled for brazing. During the brazing process, the articles are first preheated to a sufficient temperature to substantially gasify and remove the hot melt adhesive medium from the articles. This leaves only the brazing materials on the articles for clean and efficient brazing of the articles in a conventional brazing oven. In one embodiment, the hot melt adhesive medium takes the form of a hot melt glue from the chemical family of ethylene-vinyl acetate bases.

6 Claims, 7 Drawing Sheets

METHODS OF BRAZING AND PREPARING ARTICLES FOR BRAZING, AND COATING COMPOSITION FOR USE IN SUCH METHODS

This application is a divisional of U.S. application Ser. No. 08/703,021 filed Aug. 26, 1996 now U.S. Pat. No. 5,772,104.

BACKGROUND OF THE INVENTION

The present invention relates generally to joining articles, such as heat exchanger components, by brazing. More particularly, the present invention relates to inventive methods of brazing and adhering brazing materials to components to be brazed. The invention also includes coating compositions for use in such methods.

One popular brazing process is the NOKOLOC brazing process developed by Alcan International Ltd., of Montreal, Canada. Briefly, the process includes the steps of forming an assembly, applying a brazing slurry to the assembly, blowing off the excess slurry, drying the slurry onto the assembly, and then passing the assembly through a brazing furnace. The brazing slurry generally includes a brazing alloy and a flux material, but may include additional materials.

The NOKOLOC brazing process is commonly used for the manufacture of all- aluminum heat transfer products such as condensers and oil coolers used for automotive and commercial applications. Corrosion of such components is an important issue in the industry, especially in automotive applications due to the constant exposure to road salts, acid raid and the like. Consequently, it has become a common practice in the industry to flame spray small amounts of zinc onto the components to protect the surfaces of the tubes and fins of such heat transfer products. However, the flame spraying process is expensive, wasteful and presents safety and environmental risks. In addition, this process has led to difficulties in the brazing process and in the resultant product. For example, uneven or heavy application of the zinc can erode the aluminum tubes and can cause holes to form in the final product. In addition, the zinc becomes an important part of the "filler metal" between the components since the zinc melts at a much lower temperature than the brazing material. This results in a "zinc rich filet" between the components, and such filets have a tendency to corrode rather rapidly because the zinc is used as a "sacrificial" material that corrodes before the underlying components.

Another problem encountered in the NOKOLOC brazing process is that more "filler metal" is often required at the junction between the tubes and headers of a heat exchanger assembly than between the tubes and fins. To overcome this problem, many manufacturers currently apply a paste-like substance which contains a high amount of powdered silicon to act as a filler metal in the junction between the tubes and headers prior to brazing. The paste-like substance provides additional filler metal between the tubes and headers and adds additional mechanical strength to the filet. One such substance is known under the designation Omni-Paste and is commercially available from Omni-Technologies Corp. of Epping, N.H. However, such materials are expensive and occasionally interfere with the brazing process through the action of silicon erosion of the underlying aluminum tubes and headers.

One other known method for providing more "filler metal" at the juncture between the tubes and headers is disclosed in U.S. Pat. No. 5,100,048. That patent discloses a process of applying pure silicon powder to the heat exchanger components, and the powder, at brazing temperatures, diffuses into the underlying aluminum material and causes an eutectic mixture to form. The eutectic mixture then melts at a lower temperature and forms a filler metal that brazes the assembly together. However, it has been found that the pure silicon powder does not work well when added to the brazing slurry in the NOKOLOC brazing process. Rather, the silicon powder must be applied to the tubes in a more evenly distributed manner. When the silicon is not evenly applied to the components, the silicon causes uneven formation of the filler metal, which leads to erosion of the tubes, fins and headers of the product.

One advantageous method of brazing heat exchanger components in order to overcome the foregoing deficiencies in the prior art is described in co-invented and co-owned U.S. Pat. No. 5,544,698 (U.S. application Ser. No. 08/220, 159). Briefly, that patent teaches advantageous methods of applying differential coating compositions of brazing materials to heat exchanger components prior to assembling and brazing the components. By pre-coating the aluminum or other material with selected differential coatings, the invention permits relatively uniform and selective application of zinc and silicon (as well as other brazing materials) to the aluminum components to avoid problems associated with the prior art brazing processes. In one embodiment, the patent teaches that a liquid cement can be used to apply the brazing materials (such as powdered or particular flux material, brazing alloy, zinc or silicon) onto the aluminum components in a coating. One such liquid cement, which is both a binder and vehicle, is commercially available and sold under the trademark NICROBRAZ, and available from Wall Colmonoy Corporation, Madison Heights, Mi. However, such liquid cements are toxic and result in environmental, safety and health concerns when used in a brazing process. Such liquid cements may also have adverse chemical reactions with other brazing materials and may leave a corrosive residue on the assembly.

Adhesives other than liquid cements can also present certain problems when used in the brazing process. Specifically, such adhesives are almost universally hydrocarbons, and the heat of the brazing process can break the bonds between the hydrogen and carbon atoms, leaving unwanted carbon residue on the finished product. The unwanted carbon residue can cause corrosion initiation sites to form on the heat exchanger components.

SUMMARY OF THE INVENTION

An important aspect of this invention therefore lies in the discovery of methods of brazing and preparing articles for brazing such that the selected brazing materials are uniformly applied to the articles and the binder/vehicle for applying the brazing materials is substantially removed from the articles prior to brazing. By removing the binder/vehicle prior to brazing, the inventive methods ensure that the binder/vehicle does not interfere with the brazing process and does not leave a corrosive residue on a finished assembly. Accordingly, the inventive methods result in clean and efficient brazing of the articles as well as uniform and/or differential (when warranted) application of the selected brazing materials to ensure the production of a high-quality brazed assembly.

The foregoing results are achieved by using a hot melt adhesive medium as the binder and vehicle for applying the brazing materials to the articles to be brazed. By application of predetermined temperatures, the hot melt adhesive medium will assume any desired viscosity or state (solid, liquid or gas) to facilitate uniform mixing, easy application, and clean removal of the binder/vehicle from the inventive coating compositions.

In order to prepare the articles for brazing, the coating composition is first prepared by mixing the hot melt adhesive medium with at least one brazing material at a temperature between about 200° and 400° F. The temperature of the mixture can be advantageously controlled during mixing to provide a uniform dispersion of the brazing materials within the adhesive medium. The mixture is then allowed to cool and harden into a solid material. The coating composition is then applied to the articles to be brazed by melting it onto selected surfaces of the articles. After the coating composition cools and hardens onto the articles, the articles are ready for storage or shipping for assembly and brazing.

In one embodiment, the coating mixture is first shredded into a powder coating material. The powdered material is applied to the article by heating the article to a predetermined temperature and then spraying the powdered material over the article such that portions of the powder melt and adhere onto the article. The article may be selectively masked prior to the spraying process so that only selected areas of the article are coated.

In an alternate embodiment, the coating mixture is first formed into solid filaments, such as by extrusion. The solid filaments are then applied to the article by preheating the article to a predetermined temperature and bringing the solid filament into contact with the heated portions of the article such that portions of the solid filament melt onto and adhere to the article. The article may be selectively heated to carefully control the amount of solid filament that is melted onto the article. With use of a suitable press or other similar devices, the filament can be selectively used to coat only desired portions of the article.

The inventive coating composition may include any one of a number of a variety of brazing materials such as flux material, brazing alloy, zinc, silicon or any other desired material. In order to permit effective mixing, application and removal, the hot melt adhesive medium preferably hardens at temperatures below about 200° F., liquefies at temperatures greater than about 200° F., and gasifies at temperatures greater than 400° F. In one embodiment, the hot melt adhesive medium may take the form of a hot melt glue from the chemical family of ethylene-vinyl acetate bases. Such a material is known under the designation "all purpose hot melt glue sticks" and is commercially available from Black and Decker Canada, Inc., of Ontario, Canada.

After the articles are coated with selected differential coating, the articles are then assembled to form an assembly, such as a parallel flow-type heat exchanger. The assembly may be held in a suitable baking frame during the brazing process. During the brazing process, the assembly is preheated to a temperature sufficient substantially to gasify and remove the hot melt adhesive medium from coating compositions. This leaves only uniformly applied the brazing materials on the assembly. The assembly is passed through a conventional brazing oven for clean and efficient brazing of the assembly without the interference of a binder or vehicle.

During preheating of the assembly, a reclamation unit may be advantageously used to reclaim the hot melt adhesive medium as it gasifies and is removed from the assembly. The reclamation mechanism may include a fan for drawing the gaseous medium off of the assembly and circulating the gaseous medium over a plurality of cooled plates where the gaseous medium will cool and harden. Subsequently, the plates may be heated to liquefy and drain the hot melt adhesive medium into a suitable container for later reuse or recycling.

The present invention is particularly useful for applying brazing materials to an article for brazing. However, it will be understood that the methods of this invention may also be used to apply other types of coatings to articles for other purposes. In such methods, the hot melt adhesive medium facilitates easy mixing and application of the selected coating materials and can be easily removed by heating the article so that a uniform coating of only the selected coating materials is left on the article. The coated article is then ready for further processing in accordance with the desired application.

Other objects, features and advantages of the present invention will become apparent from the following description and drawings.

DETAILED DESCRIPTION OF THE PREFERRED EMBODIMENTS

Figure 1:
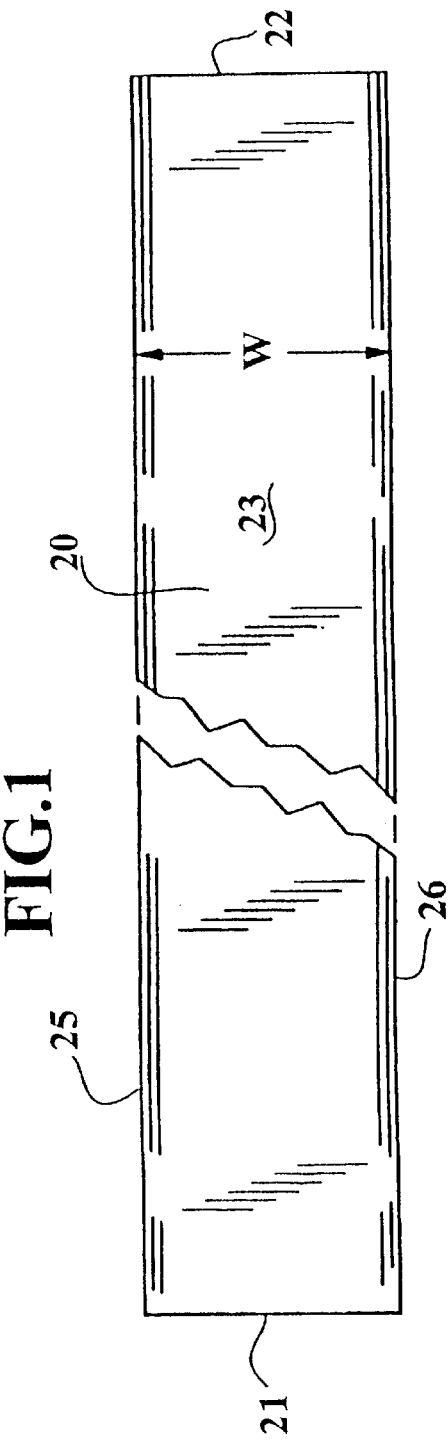
FIG. 1 is a side elevational view of a extruded microtube for use with the present invention.
Figure 2:
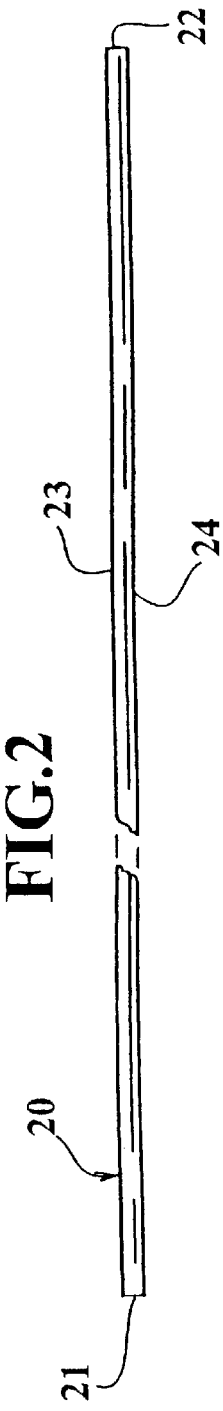
FIG. 2 is a top plan view of the extruded microtube shown in FIG. 1.
Figure 3:
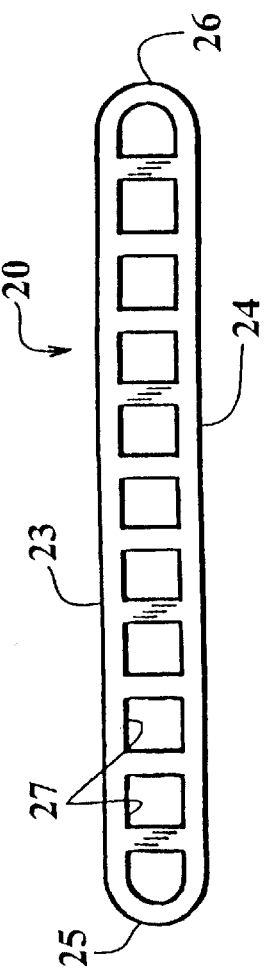
FIG. 3 is an enlarged end view of the extruded microtube shown in FIG. 1.

Referring to the drawings, the numeral 20 generally designates an elongated extruded microtube which is substantially rectangular in shape. The tube 20 includes first and second ends 21 and 22 and top and bottom surfaces 23 and 24. The tube 20 also includes side edges 25 and 26 and includes a plurality of ports or channels 27 that extend between the ends 21 and 22 of the tube. Such extruded microtubes are conventional and are preferably made of aluminum due to its advantageous heat transfer characteristics. The present invention is particularly concerned with the brazing of such extruded microtubes to other heat exchanger components. However, it will be understood that the invention is equally applicable for brazing other types of brazable articles and for coating articles in general.

Figure 4:
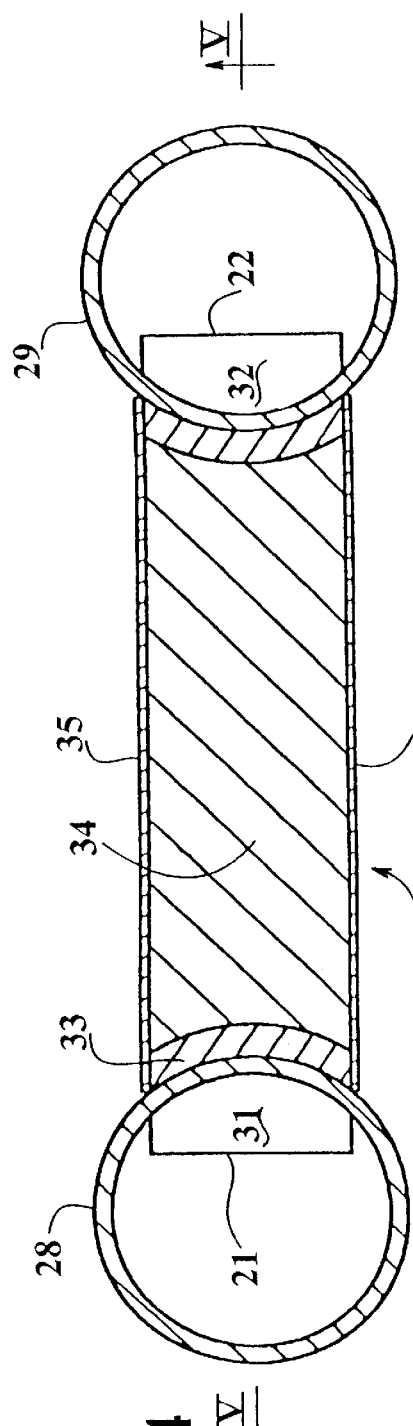
FIG. 4 is a top plan view of a extruded microtube having differential coatings and being positioned adjacent to the headers of a parallel flow-type heat exchanger during assembly.
Figure 5:
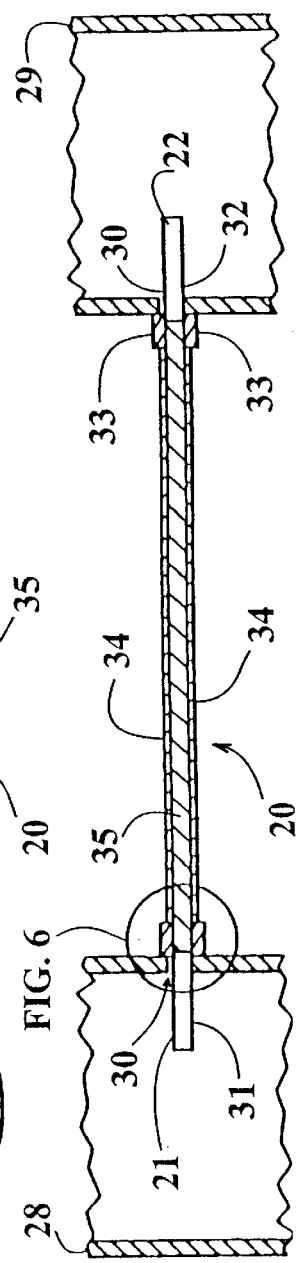
FIG. 5 is a sectional view taken along lines V—V shown in FIG. 4.
Figure 6:
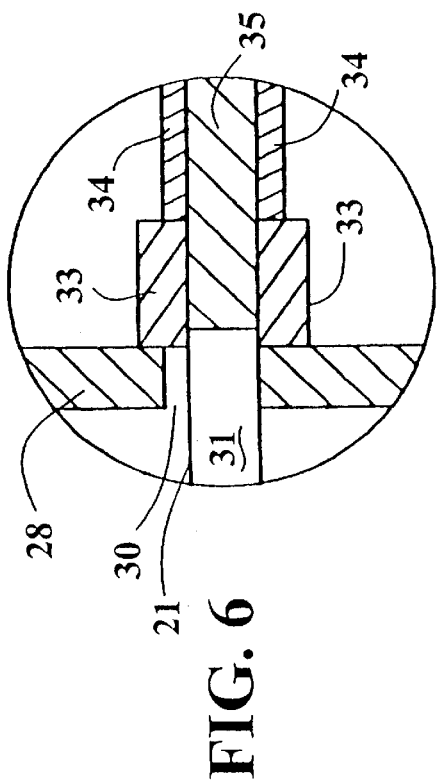
FIG. 6 is an enlarged view of the engagement and position of the ends of the extruded microtube into the slots of the headers of the heat exchanger assembly.

Referring to FIGS. 4–6, the extruded microtube 20 is shown joined to a pair of headers 28 and 29 to form a parallel flow-type heat exchanger assembly. The first and second ends 21 and 22 of the tube 20 are received within slots or openings 30 within the headers 28 and 29. Adjacent to the openings 30, the ends 21 and 22 of tube 20 include substantially half-moon or arcuate sections 31 and 32 that are substantially free of any kind of brazing material so that such materials cannot enter and obstruct the ports or channels 27 of the tube 20.

Tube 20 is provided with a plurality of differential coatings for brazing the heat exchanger components together, and such coating materials are fully described in U.S. Pat. No. 5,544,689 (application Ser. No. 08/220,159), which is hereby incorporated by reference. The differential coatings described in that patent are briefly described below to promote a full understanding of the present invention.

Tube 20 is provided with first coatings or built-up layers 33 deposited near the ends 21 and 22 of the tube. The first coatings 33 preferably include an adhesive vehicle, a flux material and an aluminum brazing alloy. Since the first coatings 33 are built up adjacent to the ends of the tube 20, coatings 33 facilitate insertion and positioning of the ends of the tube 20 within the headers 28 and 29. During the brazing process, the coatings 33 form a substantial part of the filet between the tube 20 and headers 28 and 29 and are preferably free of zinc to avoid the formation of a zinc-rich filet, which could otherwise cause premature corrosion of the components.

The top and bottom surfaces 23 and 24 of the tube 20 are provided with a second coating 34 including an adhesive vehicle, flux material, silicon and zinc. The silicon in the second coating 34 permits the manufacturer to attach unclad finstock to the tube 20 without the expensive addition of brazing sheet materials to the fins. In addition, the zinc in the second coating 34 provides a uniform protective layer by diffusion over the major surfaces of the tube 20.

The side edges 25 and 26 of tube 20 are provided with a third coating 35 including an adhesive vehicle, flux material and zinc. The third coating 33 is substantially free of aluminum brazing alloy because the edges of the tube 20 are not normally joined to any other components, except near the ends of the tube 20 where capillary action will cause the brazing alloy of the first coatings 33 to flow over that portion of the junction between the tubes and headers. The third coating is also substantially free of silicon to avoid silicon diffusion in this area which is most prone to corrosion. However, the third coating 35 preferably includes zinc for providing corrosion resistance in this area. The zinc coatings on the side surfaces of the tube combines with the zinc coatings on the top and bottom surfaces of the tube to form a uniform protective coating which also provides a uniform galvanic potential throughout the finished heat exchanger assembly.

U.S. Pat. No. 5,544,698 (application Ser. No. 08/220,159) teaches methods of applying the first, second and third coatings to the tube 20 by painting, silk screening or printing the coatings onto the tubes by using, for example but not limited to, ink-transfer wheels. That patent also teaches that the selected brazing materials may be dispersed within an adhesive vehicle for application to the tubes, such as a liquid cement commercially available under the trademark NICROBRAZ from Wall Colmonoy Corporation, Madison Heights, Mi. However, such liquid cements are toxic and present certain environmental, safety and health concerns when used in the brazing process. In addition, such liquid cements may have adverse chemical reactions with the other brazing materials, may leave a corrosive residue on the assembly, and may provide for a less than uniform application of the brazing materials to the underlying aluminum components of the assembly.

Subsequent to the filing of that patent application, the inventor discovered an improved adhesive vehicle and improved methods for applying the differential coatings to the tubes. The inventor also discovered improved brazing methods that employ the coating compositions of the present invention. The improved methods and coatings are described in detail below.

Figure 7:
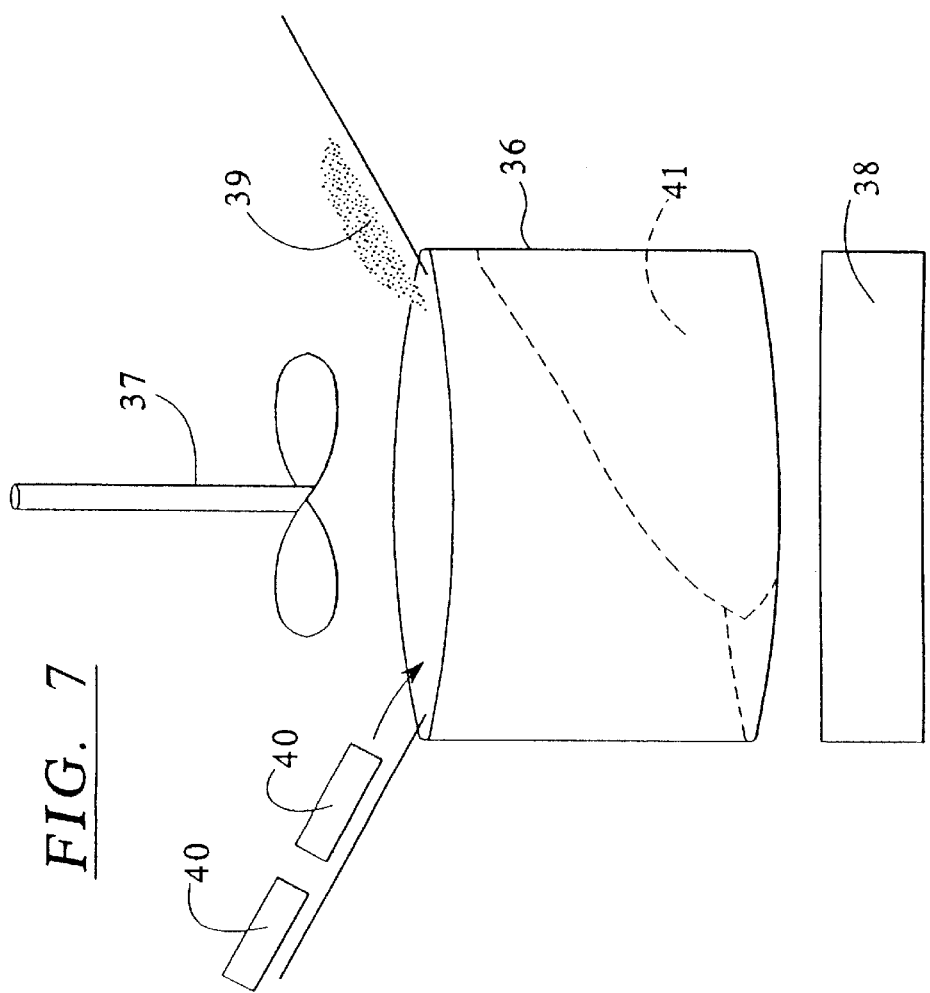
FIG. 7 is a schematic side elevational view illustrating the step of mixing the hot melt adhesive medium and brazing materials together to form a coating composition.

FIG. 7 schematically illustrates one method of preparing the coating compositions of the present invention. Specifically, a mixing mechanism is provided for mixing the coating compositions and includes a mixing vessel 36, a mixer 37 and a heat source 38. In order to prepare the selected coating compositions, the brazing materials 39 (shown in powdered form) and an adhesive medium 40 (shown in solid form) are introduced into vessel 36. The heat source 38 is then used to liquify the adhesive medium 40 and mixer 37 is used to mix the materials to form a selected coating composition. The brazing materials 39 may take the form of any desired combination and may include powered or particulate flux material, brazing alloy, zinc, silicon or any other desired brazing material. The brazing materials 39 can be specifically selected to form the first coating 33, second coating 34 or third coating 35 as previously described.

The adhesive medium 40 preferably takes the form of a hot melt adhesive medium that by application of a predetermined temperature can be controlled to take on various viscosities and states (solid, liquid or gas) to facilitate mixing, application and removal of the coating compositions. Such hot melt adhesive mediums may also be recycled for multiple uses. To achieve those objectives, the hot melt adhesive medium preferably solidifies at room temperature (or generally at temperatures below about 200° F.), gradually liquifies at temperatures greater than about 200° F., and gasifies at temperatures greater than about 400° F. Such a material permits the viscosity and state of the material to be controlled for advantageous mixing, application and removal of the material as described more fully hereinafter. In addition, such adhesive mediums act as a carrier for the brazing or coating materials, but do not combine chemically with those materials. One suitable hot melt adhesive medium is generally referred to as "all purpose hot melt glue sticks", which are commercially available from Black and Decker Canada Inc. of Ontario, Canada. This material is from the chemical family of ethylene-vinyl acetate bases, and it is believed that materials from that chemical family are suitable for use in the present invention. In addition, it will be understood that other types of hot melt adhesive mediums having similar characteristics and properties may also be used.

In the schematic mixing process shown in FIG. 7, the hot melt adhesive medium 40 and brazing materials 39 are mixed together at a temperature sufficient to liquefy the hot melt adhesive medium 40 to form a coating composition 41 within the vessel 36. The coating composition 41 should generally be heated to a temperature above 200° F. to liquify the hot melt adhesive medium 40. However, the temperature should generally not exceed 400° F. to prevent the hot melt adhesive medium 40 from gasifying. While the preferred range of temperatures for mixing the materials is generally between about 200° F. and 400° F., it will be understood that the temperature range may vary depending upon the particular hot melt adhesive medium employed in the invention. Within those general parameters, the selected temperature will also vary somewhat depending upon the particular brazing materials 39 used to form coating composition 41. For example, zinc is a very heavy metal and lower temperatures would be used for mixing adhesive medium 40 with zinc to ensure a uniform dispersion of the zinc within the medium. In contrast, brazing fluxes are fairly light materials and higher melting temperatures may be used to decrease the viscosity of the medium 40 to ensure a uniform dispersion of the lighter flux materials within the medium. In this manner, the temperature for mixing the coating composition 41 can be carefully controlled to maintain an even and uniform spacing of the brazing materials 39 within the coating composition 41.

Figure 8:
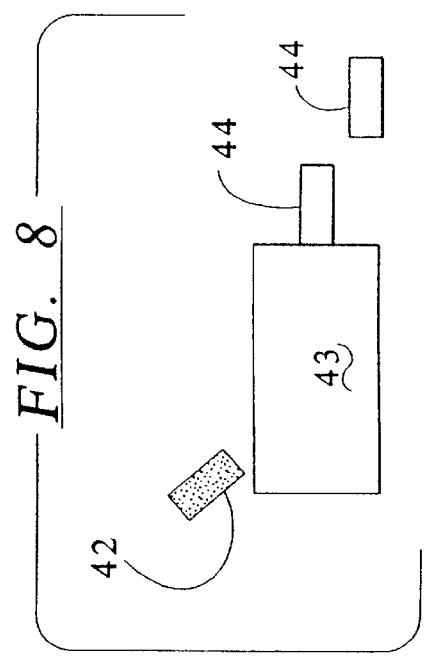
FIG. 8 is a schematic side elevational view illustrating the step of extruding the coating composition in a solid filament.
Figure 9:
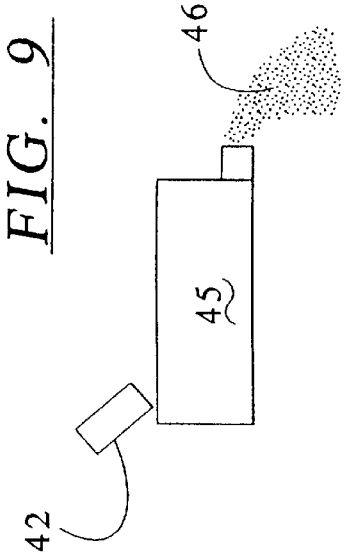
FIG. 9 is a schematic side elevational view illustrating the step of shredding the coating composition into a powder.

After adhesive medium 40 and brazing materials 39 are suitably mixed, the coating composition 41 is then allowed to cool and harden into a solid material, such as blocks 42 which are schematically illustrated in FIGS. 8 and 9. The solid material or blocks 42 are then processed to take on a desired form for application to the articles to be brazed. For example, FIG. 8 schematically shows one process of using an extruder 43 to extrude blocks 42 into a plurality of solid filaments 44. The filaments may be extruded to form a variety of shapes for later application to the articles to be brazed. As another example, FIG. 9 schematically shows one process of using a shredder 45 to shred blocks 42 into a powdered coating composition 46. It will be also understood that the coating composition 41 may take on a variety of forms depending upon the method of applying the coating composition 41 to the articles to be brazed.

Figure 10:
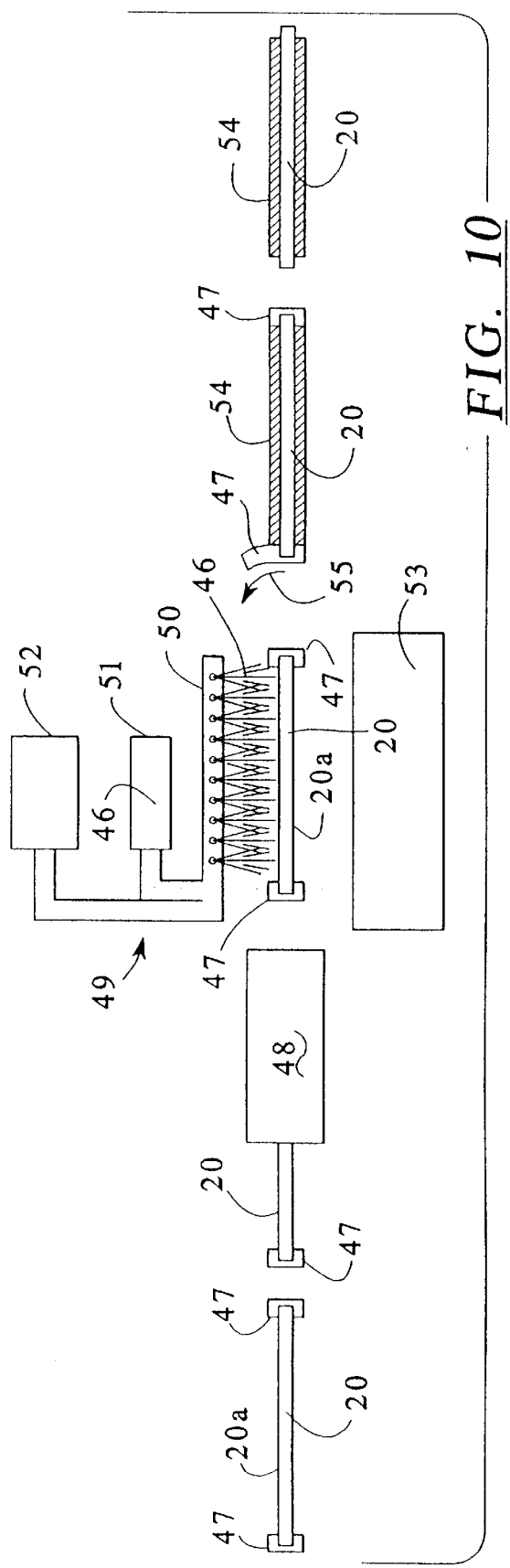
FIG. 10 is a schematic side elevational view illustrating the steps of applying the coating composition to a heat exchanger component.
Figure 11:
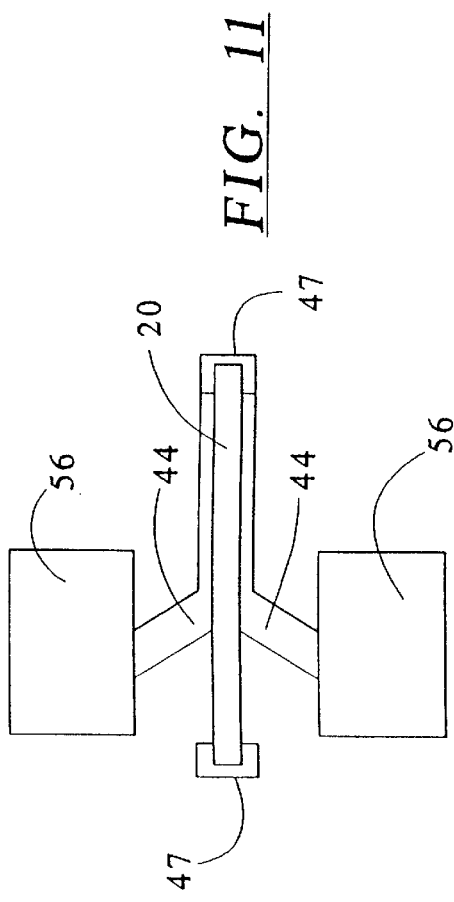
FIG. 11 is a schematic side sectional view illustrating an alternate embodiment of applying the coating composition to a heat exchanger component.

FIGS. 10 and 11 schematically illustrate methods of applying the solid coating composition 41 (in the form of power 46 and filaments 44, respectively) to the extruded microtube 20. In the method schematically illustrated in FIG. 10, a masking material 47 is first applied to the tube 20 so that only selected portions 20a of the tube 20 are exposed for application of the coating. The tube 20 is then passed through a heater 48 to heat the tube 20 to a predetermined temperature greater than a temperature at which the powdered coating material 46 melts. The powdered coating material 46 is then sprayed over the tube 20 by a spraying mechanism 49 so that portions of the powdered coating material 46 melt and adhere onto the exposed portions 20a of the tube 20. The heating of the tube 20 can be controlled to cause a precise amount of powder to stick to the tube since the heat transfer characteristics of the tube (as well as similar heat exchanger components) are uniform and predictable.

The spraying mechanism 49 may include a spraying assembly 50, a reservoir 51 of powdered coating material 46, and a compressed air source 52 for propelling the powdered coating material 46 through sprayer 50 and over the tube 20. A collection bin 53 may also be provided under the spraying mechanism 49 for collecting the powder overspray. After the spraying step, the coating material is allowed to cool and harden into a solid coating 54 on exposed areas 20a of the tube 20. The masking material 47 may then be removed from the tube 20 as shown by arrow 55.

In the alternate embodiment shown in FIG. 11, the coating method is generally the same as shown in FIG. 10 except for the form of the coating material and the specific method of applying it to the tube 20. In particular, instead of spraying a powdered composition onto the tube, a pair of presses 56 are used to bring solid filaments 44 into contact with the exposed areas 20a of the heated tube 20. Similar to the powder spray method, the heating of the tube can be carefully controlled to melt a precise amount of the filament 44 onto the tube. The filaments 44 may also be easily directed to apply the coating material to only selected areas of the tube, as well as using masking material 47. After the coating composition is melted onto the tube 20, the coating material is allowed to cool and harden into a solid coating material and the masking material 47, if used, is removed as previously described.

Figure 12:
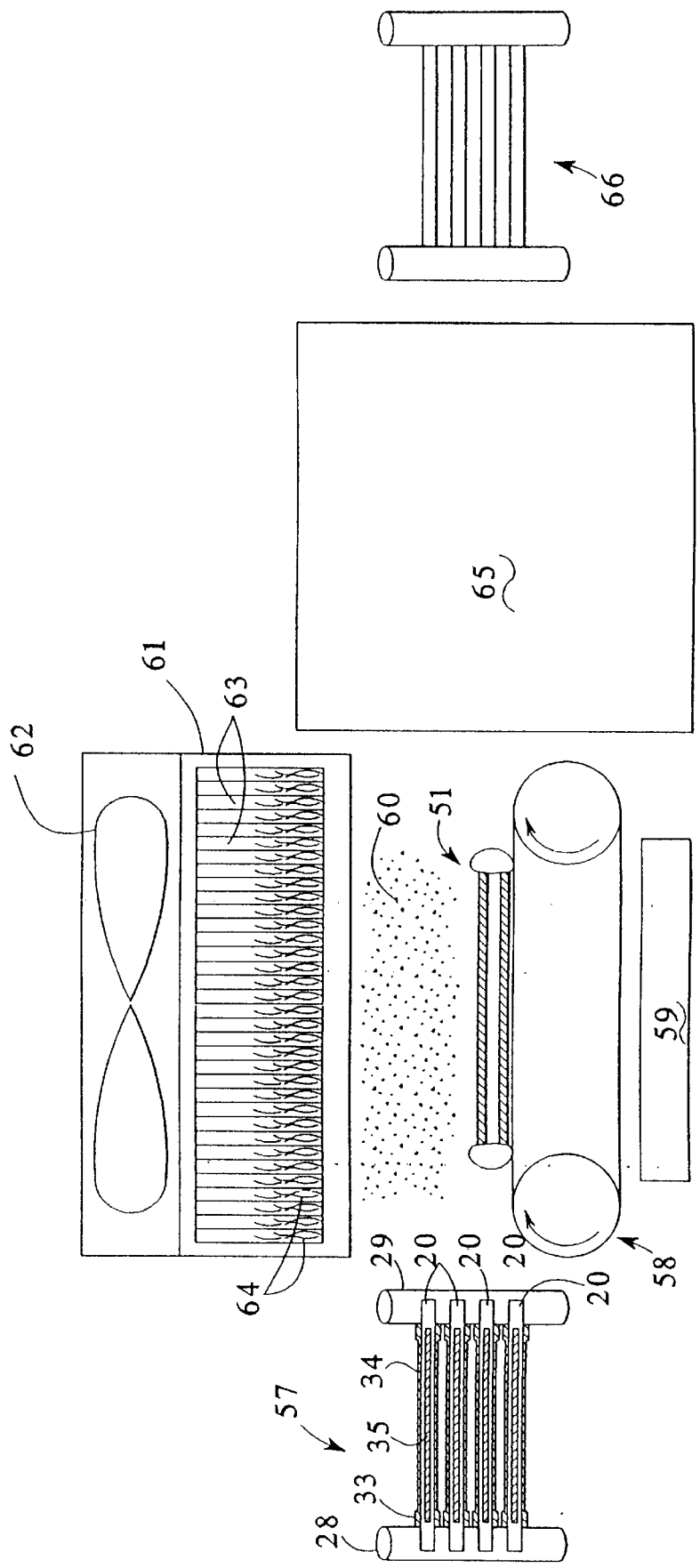
FIG. 12 is a schematic side elevational view illustrating the brazing method of the present invention.
Figure 13:
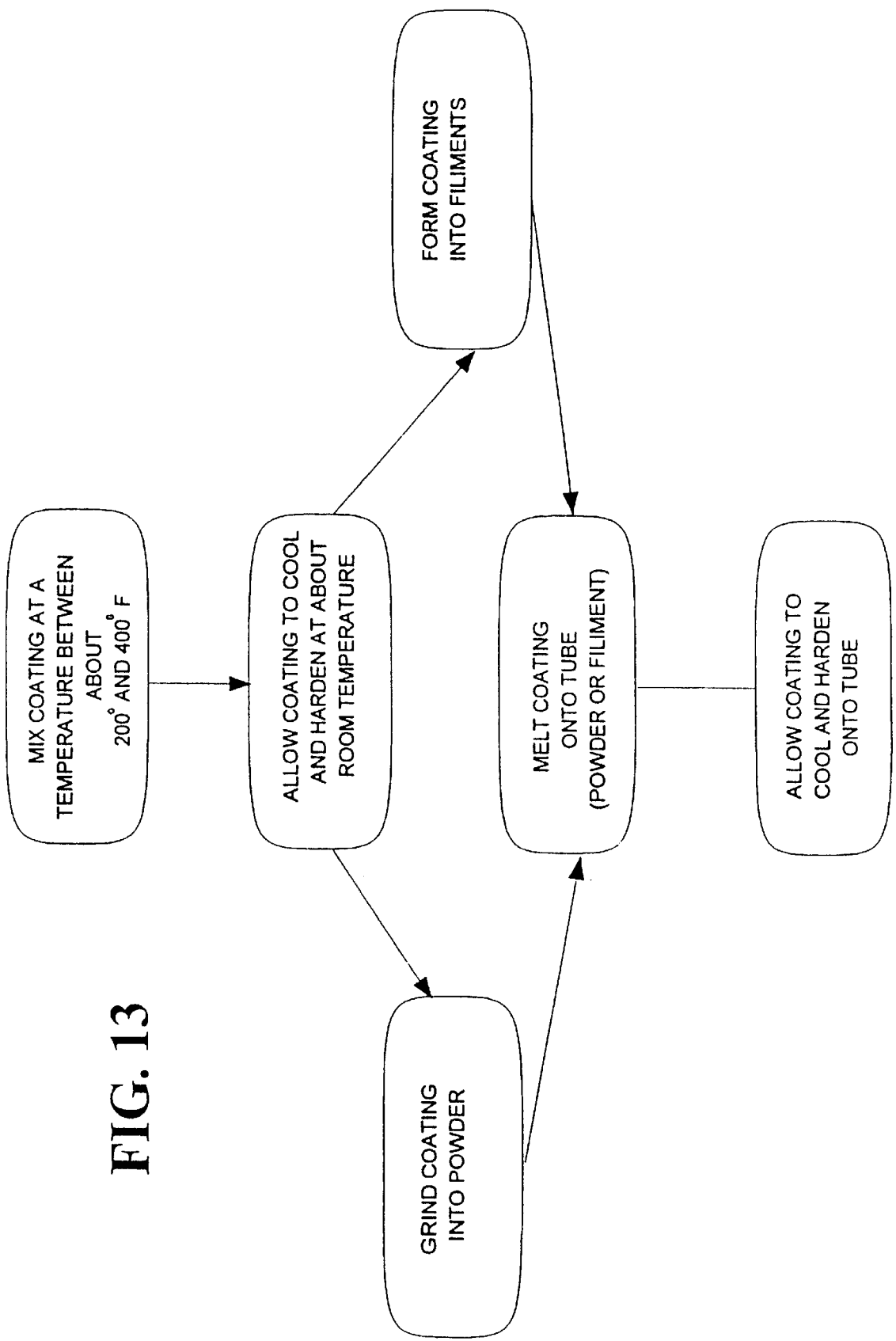
FIG. 13 is a schematic diagram indicating the various steps of applying the coating composition to heat exchanger component.

The methods of the present invention for applying the coating composition to the tube 20 (or any other article to be brazed) are diagrammatically illustrated in a flow chart shown in FIG. 13. The illustrated method steps may be accomplished by following the specific steps described in connection with FIGS. 10 and 11 or may be accomplished with other suitable and similar method steps. By following the methods shown in FIGS. 11–13, a manufacturer can selectively coat articles for brazing and ensure a uniform application of desired brazing materials to the article to be brazed. For example, the inventive methods may be advantageously used for applying the differential coating compositions 33, 34 and 35 to the tube 20 as shown in FIGS. 4–6. After the coating process, the articles or tubes can be packaged for storage or shipment, at room temperature, for later use in the brazing process. In addition, the coating methods of this invention may be used to apply other types of coatings to articles for a variety of purposes other than brazing.

FIG. 12 schematically illustrates one embodiment of the brazing method of the present invention. At the left side of FIG. 12, a heat exchanger assembly 57 is shown and includes headers 28 and 29 and a plurality of tubes 20. The tubes 20 include the first, second and third differential coatings 33, 34 and 35 as previously described. After the components are assembled to form assembly 57, a conventional bake frame (not shown) may be used to hold the assembly in a rigid and desired shape.

The assembly 57 is then placed on a conventional conveyer belt 58 to carry it through the brazing process. The first step in the brazing process is to preheat the assembly 57 with a heater 59 to a predetermined temperature sufficient to substantially gasify and remove the hot melt adhesive medium 40 from the differential coatings 33, 34 and 35 on the tubes. The adhesive medium 40 is removed in the form of a gaseous medium 60, which may be reclaimed for recycling with a reclaiming unit 61. In particular, the reclaiming unit 61 includes a fan 62 which draws the gasified medium off of the assembly 57 and circulates the gas over a plurality of cooled plates 63. The gasified medium 60 then hardens and adheres to the cooled plates 63 as shown at 64. Subsequently, the plates 63 may be heated to liquify and drain the solid material 64 into suitable containers for later re-use or recycling. This permits the manufacturer to recycle the same hot melt adhesive medium a number of times for repeating the coating process for a plurality of articles.

The assembly 57 is preferably preheated to a temperature greater than 400° F. to entirely gasify and remove the hot melt adhesive medium 40 from the coating compositions and the tubes 20. After such preheating, the assembly 57 will include only the selected brazing materials 39 of the coatings and there is no adhesive or vehicle material left on the assembly 57 to interfere with the brazing process or to leave an undesirable residue on the assembly that my cause corrosion. Importantly, such hot melt adhesive mediums do not combine chemically with any of the standard brazing materials, such as flux, brazing alloy, silicon, zinc, etc., so that the medium can be easily and completely removed from the article.

After the preheating step, the brazing materials 39 will continue to adhere to the tubes 20 even after the medium is removed, although not as strongly as when the medium is present. However, strong adhesion is not required at this point because the assembly is completed and there is no substantial handling of the assembly except for passing the assembly 57 through a brazing oven 65. Since only the brazing materials 39 are left on the assembly 57, the assembly 57 is cleanly and efficiently brazed in the conventional brazing oven 65 to produce a high-quality assembly 66.

In the foregoing methods, it is important that the hot melt adhesive medium 40 take the form of a material that will not leave a carbon residue on the assembly 57. For example, many adhesives are hydrocarbons and heating such adhesives will cause the bonds between the carbon and hydrogen atoms to break so that carbon residue is left on the finished product. Such carbon residue can cause corrosion initiation sites to undesirably form on the finished product. The inventor has discovered that simple compounds of the hot melt glue family are particularly suitable for use in the present invention. Specifically, such materials will retain their carbon atoms during the preheating step so that the adhesive medium 40 is substantially gasified and removed from the assembly 57 during the preheating process so that no carbon residue is left on the assembly 57. In addition, such adhesive mediums do not chemically combine with standard brazing materials. One particularly suitable adhesive medium from the ethylene-vinyl acetate base chemical family and is generally referred to as "all purpose hot melt glue sticks" available from Black and Decker Canada, Inc. of Ontario, Canada.

To test the suitability of this material, a number of tests were run to ensure that preheating the material to temperatures above 400' F., generally to about 500° F., would sufficiently remove the material in the form of a gas from an assembly during preheating so that no carbon residue would be left on the assembly. The tests were performed using a plurality of aluminum coupons which were accurately weighed using a scale to find their "original weight". The hot melt glue was then applied to each of the coupons and the coupons were then weighed again. The coupons were then heated to a temperature above 200° F. to liquefy the hot melt adhesive medium 40. However, the temperature should generally not exceed 400° F., specifically to about 500° F., and fans were used to draw off the gasified glue. The coupons were then weighed again.

The results of these tests demonstrated that the aluminum coupons after heating weighed the same as before application of the hot melt glue. Thus, heating the coupons to a temperature above 400° F. completely removed the hot melt adhesive medium from the coupons. Stated differently, the hot melt glue retained its carbon atoms through the heating process such that no undesirable carbon residue was left on the coupons. While such materials from the hot melt glue or ethylene-vinyl acetate base family are believed to be particularly suitable for use in the present invention, it will be understood that other materials having similar properties and characteristics may also be used.

Figure 14:
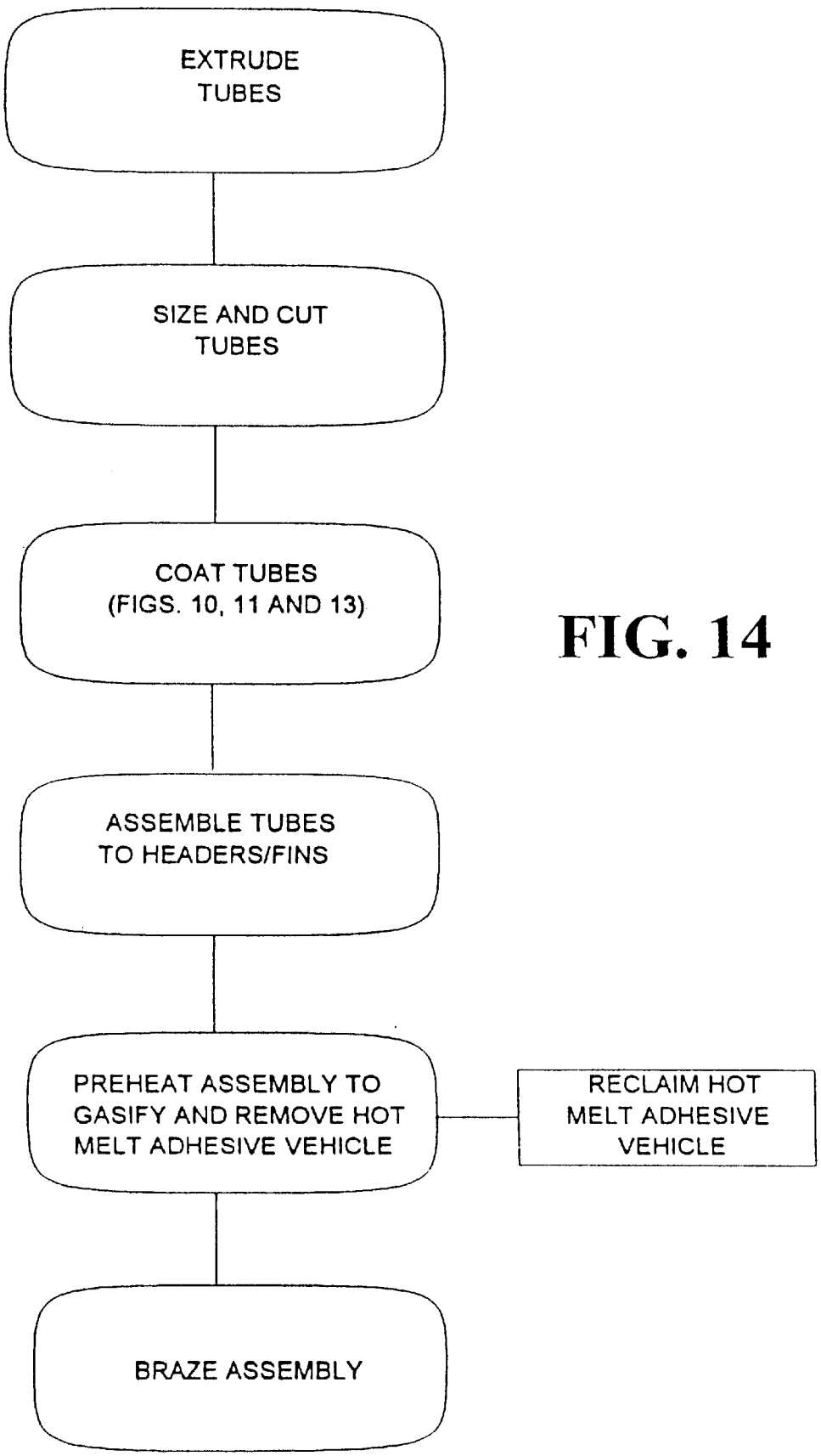
FIG. 14 is a schematic diagram indicating the various steps of the brazing method of the present invention.

The brazing method of the present invention is also diagrammatically shown in the flow chart in FIG. 14. As shown, the method includes the steps of first extruding the tubes and then sizing and cutting the tubes for the desired assembly. The tubes are then coated with the coating compositions of the present invention as previously described in connection with FIGS. 10, 11 and 13. The tubes are then assembled to the headers and fins to form the assembly 57. The assembly is then preheated to substantially gasify and remove the hot melt adhesive medium from the coatings on the tubes. During the preheating step, the hot melt adhesive medium may be reclaimed for later use. The assembly is then brazed to form a finished product. The brazing method of the present invention may be accomplished by employing the steps generally described in connection with the schematic process shown in FIG. 12. However, it will be understood that a variety of conventional apparatuses may be used in practicing the brazing method of the present invention.

While in the foregoing specification embodiments of the invention have been disclosed in considerable detail for purposes of illustration, it will be understood by those skilled in the art that the details given herein may vary considerably within the spirit and scope of this invention.

What is claimed is:

1. A coating composition for preparing articles for brazing, said composition comprising:

a hot melt adhesive medium which hardens at temperatures generally below about 200° F., melts and liquefies at temperatures above about 200° F., and gasifies at temperatures above about 400° F.; and at least one brazing material dispersed within said hot melt adhesive medium and including a brazing alloy and a flux material.

2. The composition of claim 1 in which said at least one brazing material comprises zinc.

3. The composition of claim 1 in which said at least one brazing material comprises silicon.

4. The composition of claim 1 in which said hot melt adhesive medium comprises an ethylene-vinyl acetate base.

5. The composition of claim 1 in which said composition is in the form of a powdered coating material.

6. The composition of claim 1 in which said composition is in the form of a solid filament.

* * * * *